Figure 1:
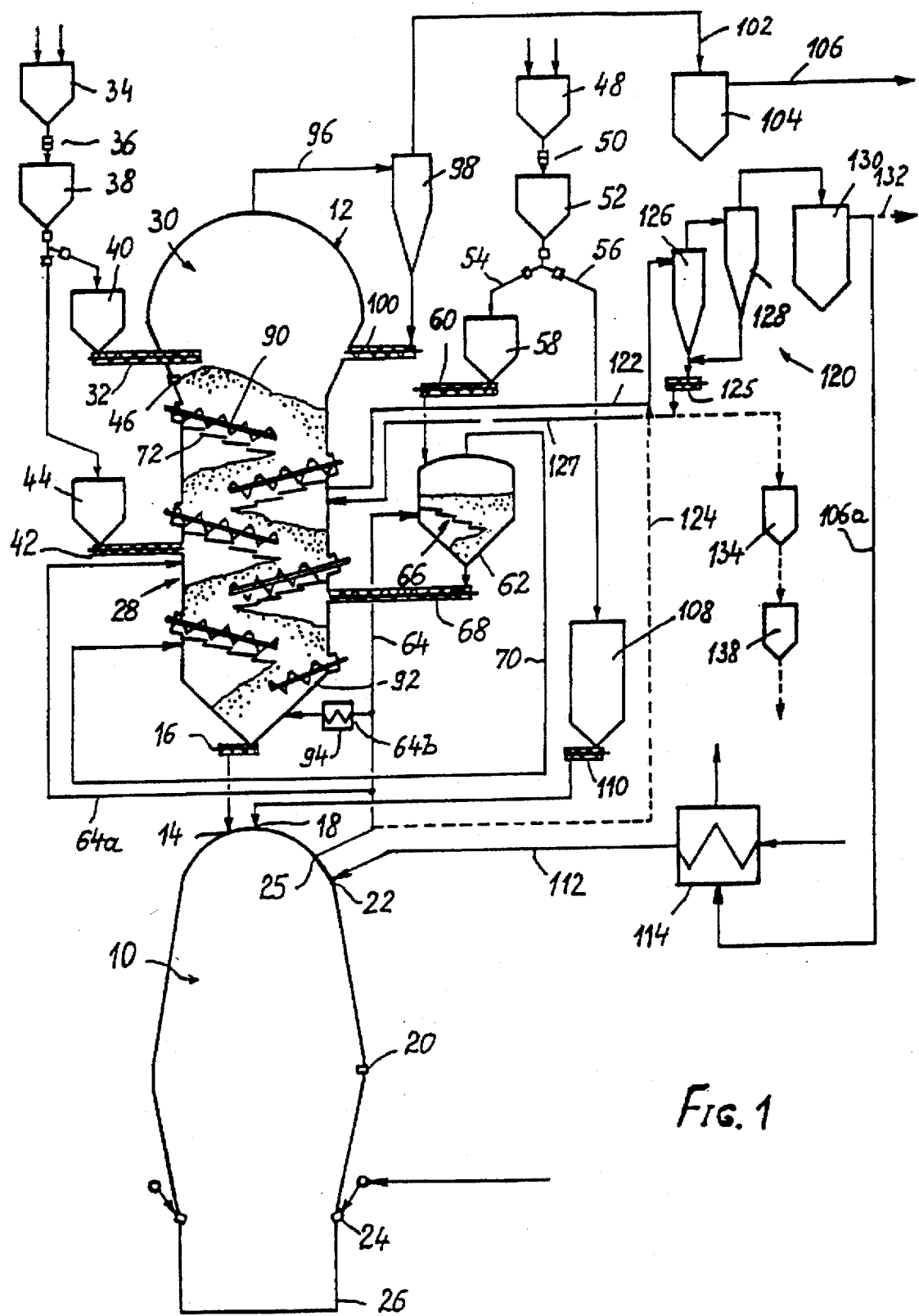

United States Patent [19]

Vuletic et al.

[11] Patent Number: 5,669,955
[45] Date of Patent: Sep. 23, 1997

[54] PROCESS FOR PRODUCING PIG IRON FROM IRON ORES, AND APPLICANCE FOR THE THERMAL AND/OR CHEMICAL TREATMENT OF A READILY DISINTEGRATING MATERIAL OR FOR PRODUCING PIG IRON BY MEANS OF SAID PROCESS

[76] Inventors: Bogdan Vuletic, Bilker Strasse 19, 40213 Dusseldorf; Bojan Vuletic, Zweibruckenstrasse 8, Hans A4, D-80331 Munich; Vladan Vuletic, Baaderstrasse 10b, D-80469 Munich, all of Germany

[21] Appl. No.: 446,710

[22] PCT Filed: Nov. 29, 1993

[86] PCT No.: PCT/EP93/03340

§ 371 Date: Jul. 17, 1995

§ 102(e) Date: Jul. 17, 1995

[87] PCT Pub. No.: WO94/12672

PCT Pub. Date: Jun. 9, 1994

[30] Foreign Application Priority Data

Nov. 30, 1992 [DE] Germany .................. 42 40 197.6

[51] Int. Cl.⁶ .................................................. C21B 7/24
[52] U.S. Cl. .................. 75/381; 75/386; 75/436; 75/469; 75/491; 266/87; 266/181

[58] Field of Search .................... 75/381, 436, 469, 75/499, 491, 492, 503, 505, 386; 266/87, 181

[56] References Cited

U.S. PATENT DOCUMENTS 3,512,766  5/1970  Oberndorfer .................... 266/175
4,670,049  6/1987  Kelmar ............................ 75/464

*Primary Examiner*—Melvyn Andrews

[57] ABSTRACT

A process for producing pig iron from iron ores involves the iron ores traveling from the top downwards through a reduction unit via a succession of oblique trays which are staggered in a cascade-like manner. A hot reduction gas containing carbon monoxide and hydrogen flows from the bottom of the reduction unit upwards. A reduction product is drawn off at the bottom end of the reduction unit and is fed to a unit for further treatment thereof. A reduction gas is generated in a gas generator by partial oxidation of carbon carriers or by cracking of natural gas or petroleum. Iron ores having at least a high proportion of dust-like and/or fine granular iron ores are sorted into fractions according to grain size and introduced into the reduction unit in such a way that the course fraction of the iron ore is introduced into the top section of the system and the fine fraction of the iron ore is introduced into the middle zone or into the middle and bottom zones of the system.

54 Claims, 3 Drawing Sheets

PROCESS FOR PRODUCING PIG IRON FROM IRON ORES, AND APPLICANCE FOR THE THERMAL AND/OR CHEMICAL TREATMENT OF A READILY DISINTEGRATING MATERIAL OR FOR PRODUCING PIG IRON BY MEANS OF SAID PROCESS

DESCRIPTION

The invention relates to a process for producing pig iron from metal ores, in which the metal ores and optionally added additions travel from the top downwards through a reduction unit through which a hot reduction gas containing carbon monoxide and hydrogen flows from the bottom upwards, and the reduction product is drawn off at the bottom end of the reduction unit and is fed to a unit serving for further treatment thereof, the reduction gas being generated in a gas generator by partial oxidation of carbon carriers or by cracking of natural gas or petroleum, and to an apparatus for the thermal and/or chemical treatment of a readily disintegrating material or for producing pig iron by means of said process, with a first unit for generating a hot gas, in particular a reduction gas, and a second unit for holding the material to be treated thermally and/or chemically, having at least one material inlet arranged in the top section of the second unit and at least one discharge appliance arranged at the bottom end of the second unit for drawing off the material treated thermally and/or chemically, and having at least one inlet for the hot gas arranged in the bottom zone of the second unit.

It has been known for a long time that iron ore in the form of pellets, chunks or lump ore can be converted in a blast-furnace into sponge iron by allowing a hot reduction gas to flow from the bottom upwards through a descending bed of ore particles.

Technical difficulties and economical problems are posed, on the other hand, by the reduction of the ore if it is present in fine form. Although it has been proposed to reduce fine ore in a fluidized-bed reduction reactor to produce sponge iron, the fine ore particles being suspended in a hot reduction gas. However, it is equally known that, upon attaining it [sic] degree of reduction of over 60%, the fine sponge iron particles begin to agglomerate in such a process, and that, as the degree of reduction increases, large clusters are formed which block the gas paths through the ore and usually result in the failure of this procedure.

A further drawback of these known processes is the high loss of material due to dust discharge, and a high energy expenditure. The dust is produced mainly in the bottom zone of the reduction unit and may be enriched with additional dust originating from the gas generator. The reduction gas carries this dust along.

The product of these direct reduction installations is sponge iron in the form of lumps or compacted into briquettes, which is smelted in electric furnaces or other units.

A more recent process, implemented industrially and described in German Patent Specification 2843303, like the conventional blast-furnace route requires as its starting material screened lump ores and fine ore processed into pellets or sinter. The latter, however, requires additional investment and a higher energy expenditure. The process consists in the sponge iron being discharged hot from the shaft furnace and being smelted in a smelting gasifier, using coal as an energy source and oxygen as an oxidant. The gas generated in the smelting gasifier during the smelting process is used, after dedusting in a cyclone end part-stream cooling in a scrubber, as the reduction gas for the reduction shaft. The hot dust precipitated in the cyclone is recycled into the smelting gasifier and is gasified with the aid of an oxygen burner. Recycling and gasifying the hot dust, which has a temperature of approximately 800° C., is not without its problems, and any disruption in this system leads to problems in the reduction shaft, as it can accommodate only limited amounts of dust, although it is operated only with lumpy iron oxides.

The blast-furnace route requires coke as an energy source, whose production constitutes that step in the pig iron production process, which is the most heavily polluting and results in an enormous increase in production costs. In addition, a shortage of coking coal of acceptable quality is apparent even today. In contrast to the blast-furnace, in the case of the abovementioned, more recent process, known under the designation COREX, coke is already being replaced by conventional coal, but COREX still requires coarse iron oxide.

The object of the invention is to provide a novel process for producing pig iron on the basis of fine ore, which process permits the direct use of fine ore without previous processing or moulding, and moreover permits the unchanged use of ore in the fine/coarse ore ratio obtaining in the ore mines and usually having a fine ore proportion of 60–100%. At the same time, pelletizing and sintering installations, as well as crushing installations for coarse ores, are to be dispensable, and coal is to be suitable as an energy source and carbon carrier, but coke should not be excluded, in order to make use of existing installations.

In particular, the novel process is to prevent the formation of agglomerates in the reduction zone and high dust discharge.

Another essential object is to design the process in such a way that existing appliances, in particular blast-furnaces, can still be used after having been modified in an appropriate manner to adjust them to the process.

This object is achieved by developing the process mentioned at the outset in such a way that, in particular for the purpose of processing metal ores having at least a high proportion of dust-like and/or granular metal ores, the metal ore and the additions optionally to be added are passed downwards in the reduction unit via a succession of oblique gas distributor trays which are staggered in a cascade-like manner, and that the metal ore and the additions optionally to be added are introduced, sorted into fractions according to grain size, into the system of gas distributor trays, which is located in the reduction unit, in such a way that the coarse fraction of the metal ores and optionally of the additions is introduced into the top section of the system, that the fine fraction of the metal ores is introduced into the middle zone of the system and the fine fraction of the additions optionally to be fed in is introduced, together with the fine fraction of the metal ores, into the bottom section of the system.

This procedure has the advantage that the metal ores and additions travel through the trays, which are arranged in a cascade-like manner, on a back-and-forth, downward-sloping path through the reduction unit, below the individual trays, by selecting their spacing and their arrangement in a suitable way, sufficiently large gas collection chambers being formed from which the reduction gas is able to penetrate through the orifices formed in the gas distributor trays, into the bed resting on the trays and slowly travelling downwards. At the bottom end of the gas distributor trays, the bed travels downwards to the next gas distributor tray, the large and heavy particles tending to move downwards almost vertically. In this transition zone between two gas distributor trays, the height of the bed is almost twice that above the gas distributor trays, because of which in this transition zone the gas flow is only very small, so that here virtually no dust discharge, but instead, preferentially, sedimentation of the fine particles takes place.

In the top zone of the trays this will involve a process taking place which corresponds to the so-called fixed-bed process and in which the surface layer of the coarse metal ores is exposed to the action of carbon monoxide and hydrogen of the reduction gas, so that the sponge iron particles, which are formed by the reduction of the fine metal ores and are entrained by the reduction gases from the bottom zone of the reduction unit, are able to collect on this surface, as a result of which the percentage of said fine sponge iron particles in the bottom zone, in which the course of the process corresponds to the so-called spouting-bed process, is reduced, so that cluster formation by sticking (adhesion of particles) is counteracted. By introducing only the coarse material into the top zone of the reduction unit, dust discharge from this zone, together with the spent reduction gas at the top end of the reduction unit, is considerably reduced, because the coarse material serves as a filtration layer. Moreover, the coarse material covers the longest distance within the reduction unit, which addresses the fact that the coarse fraction of the metal ores requires a longer exposure time to the reduction gases for reduction than the fine fraction. If the fine metal ores are introduced in the middle zone of the reduction unit, the outer layer of the coarse metal ores to be found there has already been reduced, and is therefore able to bind a part of the fine material immediately, so that this part can no longer be carried upwards by the reduction gases and, as mentioned, cannot result in cluster formation either. Owing to the intensive permeation by the reduction gas of the material resting on the gas distributor trays, the dust carried along by the reduction gas in an amount of approximately 150 g/m$^3$ (s.t.p.), which consists mainly of coke, coked particles of coal and—in the case of the reduction gas, as explained below, being ducted via a calcining unit—calcined addition particles, in particular in the zone of the bottom beds, will reduce the concentration of the fine sponge iron particles which tend to agglomerate. In known blast-furnaces and other metallurgical processes, in contrast, this dust is very detrimental.

The process according to the invention thus processes directly, without pelletizing or sintering installations, fine or dust-like metal ore, the additional presence of coarse metal ore lumps being significant, this being the reason, after all, why crushing installations for coarse ore are dispensable.

The fact that a very strong reduction in the concentration of the fine sponge iron particles takes place in the bottom zone of the reduction unit is demonstrated by the two following examples, which relate to an installation having a capacity of 50 t/h of pig iron or 75 t/h of iron ore or 55.5 t/h of sponge iron.

In the first example, a ratio of fine ore to coarse ore of 50:50, an addition quantity of 0.25 t/t of ore, a ratio of fine to coarse additions of 50:50 and a degree of calcining of 80% is assumed. The consumption of carbon carriers depends very strongly on the ratio in which coke and coal are used, and on the quality of the coke and coal present. If the proportion of coke is 20% and the two components are of average quality, an overall consumption of 48 t/h of the carbon carriers is to be expected. The amount of oxidant will be approximately 23,000 m$^3$(s.t.p.)/h of pure oxygen, 2500 m$^3$(s.t.p.)/h of compressed air for the smelting zone and approximately 12,000 m$^3$(s.t.p.)/h of hot air for the gas zone. This results in an amount of reduction gas of approximately 88,000 m$^3$(s.t.p.)/h, or 1170 m$^3$(s.t.p.)/t of ore or 1585 m$^3$ (s.t.p.)/t of iron sponge, with a dust content of approximately 150 g/m$^3$(s.t.p.) of reduction gas. It is further assumed that during reduction of the coarse ore up to approximately 20% thereof disintegrate into fine ore having a particle size of below 2 mm.

It follows from the above assumption that 600 kg of fine sponge iron particles are reduced in their concentration by 240 kg of dust from the reduction gas, 100 kg of fine and 100 kg of coarse calcined additions and by 400 kg of coarse sponge iron particles, hence with 840 kg of other substances which do not tend to agglomerate.

If the ratio of fine to coarse ore is 70:30, the addition quantity and its ratio remains the same as in the previous example. The amount of carbon carriers will be approximately 49.5 t/h. The amount of oxygen of 23,000 m$^3$(s.t.p.)/h and the amount of compressed air of 2500 m$^3$(s.t.p.)/h in the smelting zone can be retained, and the hot-blast amount to the gas zone of the modified blast-furnace can be increased to approximately 16,000 m$^3$(s.t.p.)/h. This results in a reduction gas amount of 94,000 m$^3$(s.t.p.)/h or 1250 m$^3$(s.t.p.)/t of ore or 1690 m$^3$(s.t.p.)/h of sponge iron, with a dust content of approximately 170 g/tm$^3$(s.t.p.) of reduction gas. In this example, 750 kg of fine sponge iron particles are reduced in their concentration with approximately 290 kg of dust and 100 kg each of fine and coarse additions and with approximately 250 kg of coarse, pre-reduced ore particles, hence with a total of 740 kg of other particles which do not tend to form agglomerates.

According to a particularly advantageous embodiment, at least above the gas distributor trays following the topmost gas distributor tray the metal ores and optionally the additions are in each case subjected to the mechanical action of a conveying and loosening device. As a result, firstly, the movement of the material, in particular including the fine material, along the gas distributor trays is assisted, and secondly the intimate mixing of the coarse and fine material and thus the binding of the sponge iron particles to the coarse metal oxides is promoted, as well as agglomerates already formed being broken down again.

It was found to be advantageous for the coarse fraction of the metal ores and the additions optionally to be added to have a particle size of 5–30 mm; preferably the particle size of the coarse fraction is limited to 5–15 mm. The particle size of the fine fractions should at most be approximately 12 mm, preferably however, at most 5 mm.

The reduction gases can be generated in a smelting unit suitable for smelting the reduction product. The gas generated during smelting of the sponge iron should have a very high reduction potential, so that it can be used as a very effective reduction gas for the metal oxide in the reduction unit. It is necessary to maintain a temperature of over 1000° C. in the upper gas space of the smelting unit. Since in the reduction unit a temperature of the reduction gas of approximately 800°–900° C., preferably approximately 850° C. is required, the reduction gases will be cooled to the required temperature, prior to being introduced into the reduction unit. To this end, according to an advantageous embodiment, the hot reduction gases between the smelting unit and the reduction unit are passed, in order to be cooled, via a calcining unit.

According to a further advantageous embodiment, the calcining unit is fed with the fine addition fraction, the addition fraction, after heating and calcining below one of the bottom gas distributor trays, being introduced into the gas space forming below each gas distributor tray in the reduction unit.

According to another embodiment, the fine addition fraction passed via the calcining unit can be admixed with coke which, firstly, removes heat from the hot reduction gas and, secondly, is thus preheated. The coke passes into the reduction unit with the additions and then is discharged from there together with the reduction product into the smelting unit.

The temperature of the reduction gases in the calcining unit is regulated by the temperature of the reduction gases in the calcining unit being controlled by rejection of heat to the amount of the additions, which is fed into the calcining unit as a function of the measured gas temperature, and to the optionally admixed coke.

The temperature in the connection line between the smelting unit and the calcining unit, and in a part of the calcining unit should be maintained at a temperature which is sufficient for cracking the tar which is contained in the carbon carrier particles entrained in the gas from the smelting unit.

The throughput capacity of the reduction unit is preferably regulated by control of the material infeed as a function of the measured level of the topmost bed and by controlling the discharge rate by means of a discharge screw at the bottom end of the reduction unit, the ratio of the individual fractions being maintained at the given ratio tailored to the quantity of reduction gas and other process parameters.

The reduction product discharged from the reduction unit may be, for example, transferred to a hot-briquetting installation and is briquetted therein. Preferably, the reduction product discharged from the reduction unit is transferred to a modified blast-furnace and is smelted, in which furnace the level of material is maintained, by means of level control, at a level which, in relation to the hot-blast plane is lowered by 45–75%.

This provides the potential for the process to be implemented industrially in a cost-effective manner, since already existing blast-furnace installations can be used for smelting the reduction product and generating the reduction gas, subject to a few adjustment modifications, so that expensive elements of the unit, such as the blast-furnace container, cooling, bottom, run-off including dedusting, as well as gas scrubbing and water system can continue to be used. As a result, not only the investment costs but also the production costs in an existing blast-furnace plant are markedly reduced, as it can be converted in a relatively short time. Since the modified blast-furnace is charged not with the ores, but with the sponge iron which no longer has to be reduced but only smelted, the level of material in the smelting unit can be lowered, as mentioned before.

The modified blast-furnace must have been extended with a few connections and feed points, in order to meet the novel requirements in terms of construction and process engineering.

The smelting unit is fed with carbon carrier in the form of coal or a mixture of coal and coke.

According to the modified operating method adapted to the process according to the invention, the hot blast conventionally used as the oxidant is replaced, at least for the most part, by oxygen or a mixture of oxygen and compressed air. In doing so, part of the oxidant is preferably added as hot blast in the upper gas space of the modified blast-furnace and the greater part of the oxidant is preferably injected as an oxygen/compressed air mixture into the smelting zone of the blast-furnace via nozzles. In the case of a ratio of fine ore to coarse ore of 50:50 according to the above-mentioned first example, the hot-blast amount will be approximately 30%, and in the case of a ratio of 70:30 according to the second example, will be approximately 40%.

In the case of a smelting capacity of 50 t/h of pig iron, a hot-blast proportion of the oxidant amount of approximately 30% or 12,000 $m^3$(s.t.p.)/h and a hot-blast temperature of approximately 1000° C., the top part of the modified blast-furnace receives an input of approximately 16.5 GJ/h of heat. As a result, approximately 4700 $m^3$(s.t.p.)/h of oxygen or approximately 17% of the total amount of oxygen required of 27,200 $m^3$(s.t.p.)/h are replaced by oxygen from compressed air and hot blast and by sensible heat of the hot blast. If the proportion of fine ore is 70% and the amount of hot blast is 16,000 $m^3$(s.t.p.)/h, 5700 $m^3$(s.t.p.)/h of oxygen or 20 [lacuna] of the total amount of oxygen required are replaced by oxygen from compressed air and hot blast and by sensible heat of the hot blast.

According to a further expedient embodiment, as the gangue proportion of the ores increases and as the amount of addition and fine ore increases, the proportion of compressed air and hot blast, respectively, in the oxidants is increased to increase the nitrogen content in the reduction gas.

The modified blast-furnace is expediently operated at a positive pressure of from 1 to 5 bar, preferably 3 bar.

According to a further expedient embodiment, part of the reduction gas from the modified blast-furnace, for the purpose of pressure equalization, after cooling to the temperature required in the reduction unit is introduced into the discharge zone of the reduction unit.

It is also advantageous to introduce uncooled reduction gas from the gas generator, in order to compensate for heat losses, into the middle zone of the reduction unit.

Another expedient embodiment consists in the spent reduction gas above the topmost bed in the reduction unit having part of the remaining dust fraction extracted from it in a disengaging space, in a reduction gas then being fed to a cyclone and the major part of the residual dust being extracted therein and in the dust produced in the cyclone being recycled to the reduction unit.

According to another advantageous version, from one of the gas spaces in the top zone of the reduction unit, part of the reduction gas, for the purpose of extracting alkaline fractions, is shunted off from the process, is dedusted, is scrubbed in a gas scrubber and is then used for preheating the compressed air fed to the modified blast-furnace.

Preferably, the addition of the fine fraction of the additions and, optionally, of a carbon carrier is carried out via the calcining unit and a proportioning screw.

The method according to the invention is not limited to the reduction of metal oxides. Its advantageous properties for preventing agglomerate formation on the basis of fine or dust-like materials and in the case of thermally unstable materials can, for example, also be employed in burning lime, in the partial reduction of manganese ores or for similar tasks.

The object of the invention is therefore also to improve the appliance mentioned at the outset, which is not solely limited to the production of pig iron. This object is achieved by, in particular for processing an at least partially fine material, but especially for reducing at least partially dust-like or fine metal ores, there being arranged in the second unit a plurality of oblique gas distributor trays, which are staggered in a cascade-like manner, alternately slope in opposite directions and are provided with gas passage holes, there being arranged above each tray at least one drivable conveying appliance which conveys downwards along the slope of the tray and loosens the material, and by the material inlet being arranged above the topmost bed and being provided with a proportioning appliance.

The conveying appliance preferably consists of up to five conveyor screws.

The use of conveyor screws has the advantage that material from the transition zone is drawn in by the screw at its start, from the gas distributor tray above the bed to the bed, the transition zone being situated above the screw and having virtually no gas flowing through it and therefore serving as a sedimentation zone for the fine particles, as a result of which the dust-like or fine material conveyed by the reduction gas stream into the upper layer of the bed is moved downwards again and is mixed with the remaining material, counteracting a more rapid passage of the coarser particles, which for complete reduction require a much longer residence time, through the unit.

This purpose is also served, according to an advantageous embodiment, by at least one strip-shaped zone of each gas distributor tray being kept free of gas passage holes, in the effective range of the conveying appliance and running in the conveying direction thereof, there being arranged, if screws are used, at least below one conveyor screw a zone which is kept free of gas passage holes. This creates a reduced-flow zone in which the fine particles can settle and be moved downwards by the conveying appliance.

Because of the high temperatures, the conveying appliance is coolable, preferably by water-cooling.

According to an expedient embodiment, each gas distributor tray consists of a plurality of tray elements which are arranged above one another and, to form the gas passage holes, are arranged at a distance from one another and, to cover the gas passage holes, are arranged so as to overlap one another in a vertical direction, and which are preferably provided with a water-cooling system.

A particularly advantageous embodiment consists in the internal diameter of the second unit above the topmost bed being enlarged to form a disengaging space, because this makes it possible to reduce further the dust discharge from the second unit.

Expediently, the second unit at the top end is provided with a gas discharge port downstream of which there is a cyclone for dust separation, the dust trap of the cyclone being connected to the second unit, preferably in the top zone, via a return line.

For the reasons already explained above it is particularly advantageous if upstream of the material inlet of the second unit there is a sorting appliance for dividing the material into a coarse and a fine fraction, and if the second unit is provided, above the bed of the topmost tray, with an inlet for the coarse fraction and above the bed of one of the middle trays, with an inlet for the fine fraction, and if assigned to both inlets there is a proportioning appliance.

According to an expedient embodiment, the first unit is suitable for generating reduction gas from a carbon carrier, and the second unit above the bed of the topmost tray is provided with an inlet for the coarse fraction of the metal ores and optionally of the additions, said second unit having, above the bed of one of the middle trays, an inlet for the fine fraction of the metal oxides and optionally of the additions.

In this arrangement, a line, which connects the first unit with that zone of the second unit which is located below the bottom-most tray, for the reduction gas is preferably run via a calcining unit, the calcining unit having a top inlet, which is assigned to a proportioning appliance and connected to a stock vessel for the fine fraction of the additions and/or the carbon carrier, and a discharge appliance for transferring the calcined and/or preheated material, and the discharge appliance above the bed of one of the two bottom-most trays being connected to the second unit.

According to a preferred embodiment the calcining unit between the inlet and the discharge appliance has at least one device for the purpose of gas distribution, which is connected to the reduction gas line emanating from the first unit, the reduction gas line leading to the second unit leaving the calcining unit in the top zone thereof.

A particularly advantageous and economical embodiment of the apparatus consists in the first unit being a modified blast-furnace which, at the top end, is connected to the discharge appliance arranged at the bottom end of the second unit, and in the top section has a further inlet, which is assigned to a proportioning appliance and connected to a storage bin which is arranged in a system under excess pressure and is designed for a carbon carrier, and in the blast-furnace in the top zone being provided with injection orifices for hot air, and in the bottom zone being provided with nozzles for injecting an oxygen/compressed air mixture or oxygen.

According to a preferred embodiment, the disengaging space has a height of approximately from 3 to 5 m.

According to an expedient refinement, below each gas distributor tray there is provided a gas collection chamber having a mean height of from 1 to 3 m.

It was found to be beneficial for the trays to have a slope of from 5° to 30°.

Preferably, the gap-forming spacing of the individual tray elements within a tray is from 30 to 200 mm.

In order to preclude agglomerate formation below the bottom-most tray prior to discharge of the reduction product, a further advantageous embodiment consists in there being arranged, in the zone between the bottom-most gas distributor tray and the discharge appliance, at least one appliance for loosening the reduction product to be discharged, which appliance is preferably a drivable, water-cooled loosening screw.

The most expedient arrangement of the conveying and loosening screws consists in mounting them in an overhung manner on the wall of the second unit.

A particularly preferred embodiment, for the purpose of reducing heat losses, consists in the cooled parts of the tray elements, of the conveying appliance and of the loosening screw being surrounded at least in part by a casing of heat-resistant material, preferably of heat-resistant steel.

Still another advantageous refinement consists in there being connected in the middle zone of the second unit, a branch line, which is designed for ducting off a smaller part of the reduction gas from the second unit and which via at least one cyclone leads to a gas purification system, and in the dust discharge of the at least one cyclone being connected to the discharge appliance of the calcining unit. This makes it possible to extract part of the alkalis in vapour form with hot gas from the blast-furnace/reduction unit circulation and thus to prevent enrichment of alkalis in the process and a consequent formation of accretions in the modified blast-furnace.

A further very advantageous refinement in this case is one in which there emanates, from the reduction gas line between the first unit and the calcining unit, a bypass which is optionally actuable and can be separated from the reduction unit, bypasses the calcining unit and opens into the branch line, so that the modified blast-furnace during repair work on the second unit, which may take some time, can continue to be operated with a minimum smelting capacity.

Where necessary, the conversion of an existing blast-furnace plant in cramped conditions can be facilitated by the second unit being subdivided into two successive subunits, the first of which is provided with an inlet for the coarse fraction and at the bottom end is provided with a discharge appliance which is connected to the top end of the second subunit which in turn is provided with an inlet for the fine fraction and an inlet, which if required runs via the calcining unit, for fine additions, optionally admixed with coke, and which is also provided with a discharge for the reduction product, and the gas outlet of the second subunit being connected to the gas inlet of the first subunit.

Figure 2:
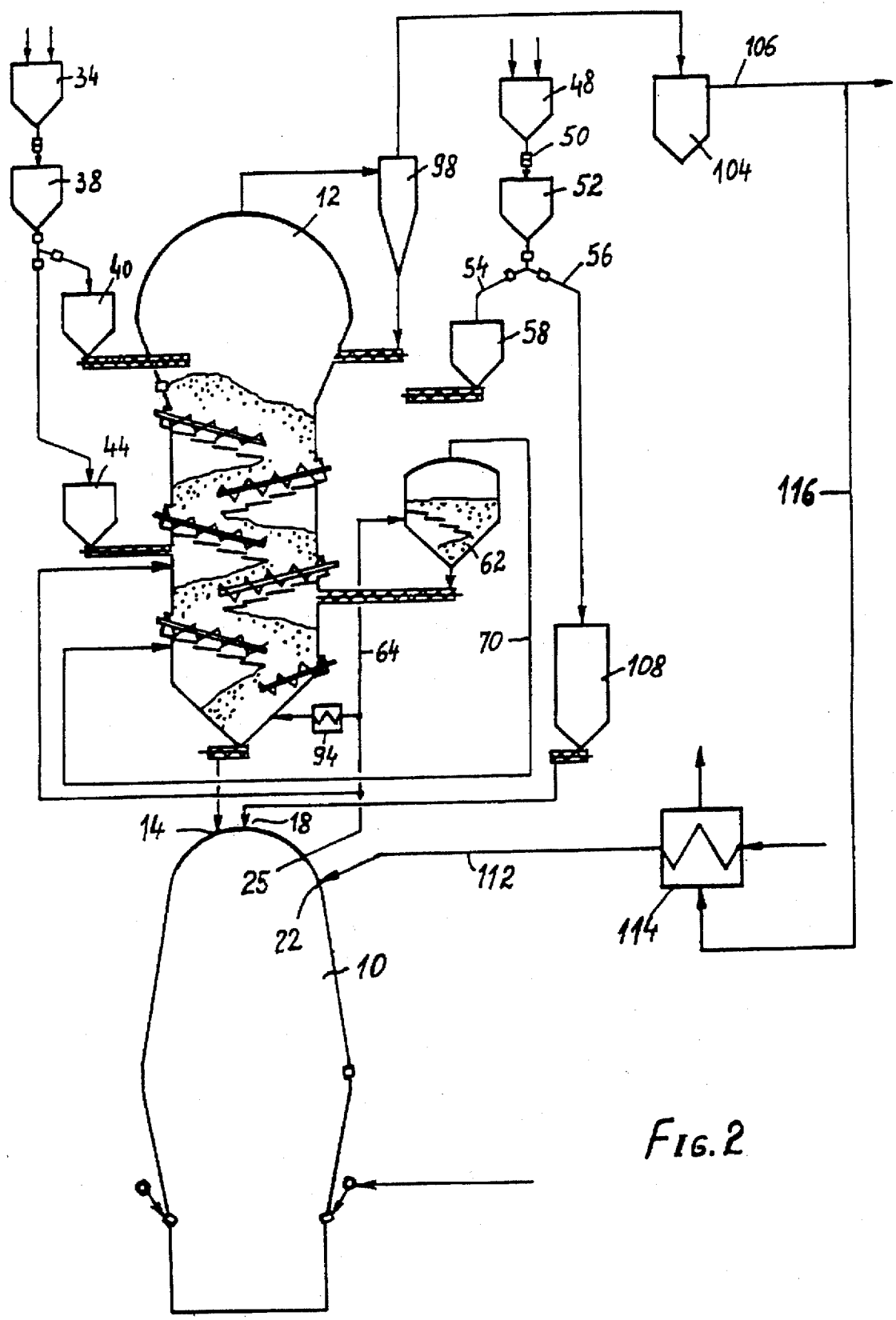
Figure 3:
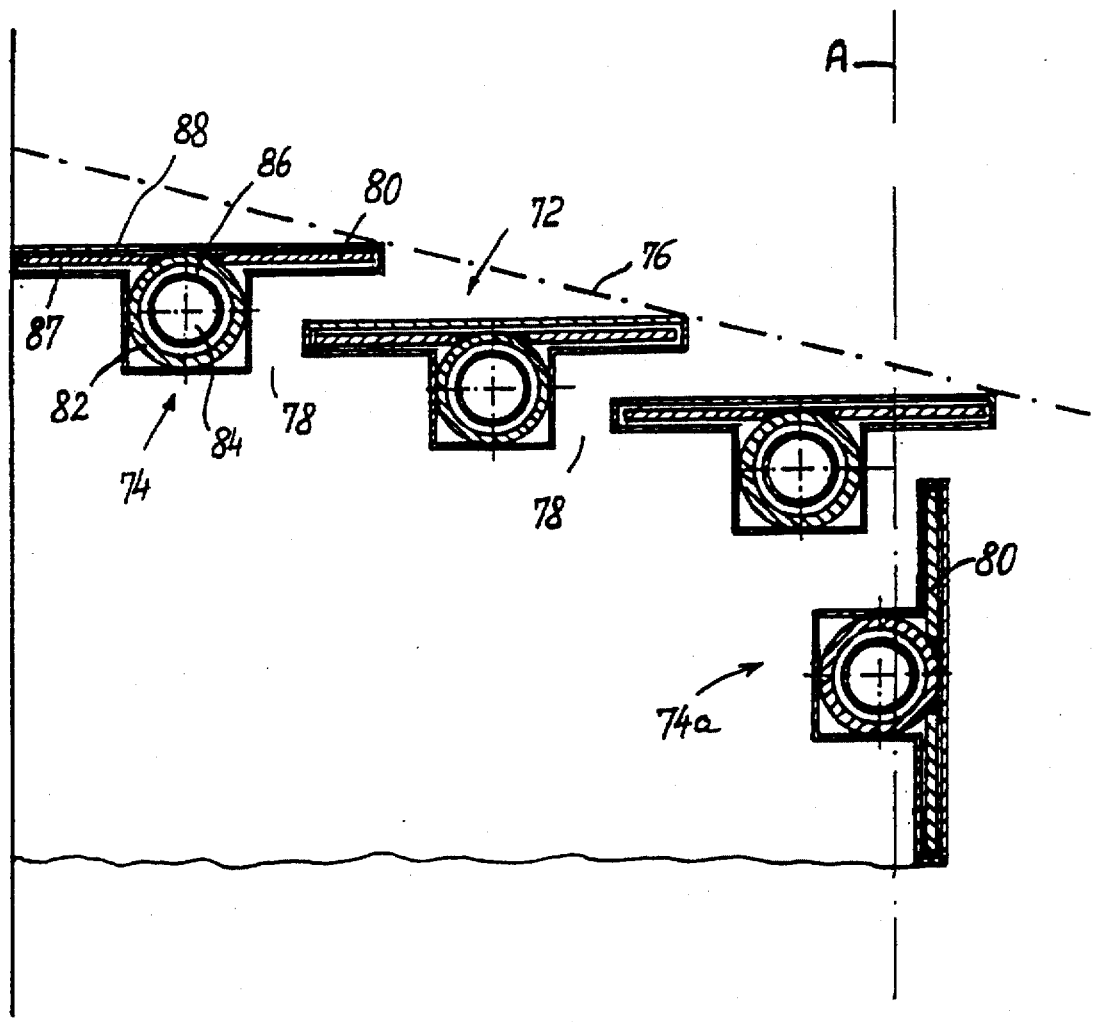

The invention is explained in more detail with reference to the following description of the embodiment of the invention depicted in the drawing, in which:

FIG. 1 shows a diagrammatic depiction of a reduction unit connected to a modified blast-furnace for carrying out the process according to the invention, FIG. 2 shows a depiction, corresponding to FIG. 1 of a simplified embodiment in which operation of the blast-furnace during repair of the reduction unit cannot continue, and FIG. 3 shows a diagrammatic section through adjacent tray elements at the bottom end of a gas distributor tray.

Since a particularly economical use of the process according to the invention is to employ an existing blast-furnace after relatively simple conversion measures both as a smelting unit and to generate the reduction gases required in the reduction unit, FIG. 1 shows such a blast-furnace 10, above which a reduction unit 12 is arranged.

The blast-furnace 10 can be charged at its upper end, at 14, with the material which is produced at the bottom end of the reduction unit 12, primarily consists of sponge iron and is discharged by a drivable discharge screw 16. A carbon carrier, preferably coal, is fed to the blast-furnace 10, likewise at its top end, at 18. In the modified blast-furnace adapted to the process according to the invention, the material level, relative to the hot-blast plane, is reduced by from 45 to 75%, preferably by approximately 60%, and is regulated via a level measuring device 20. An oxidant is introduced at 22 into the upper gas space and at 24 into the smelting zone of the blast-furnace 10, specifically hot air at 22, and oxygen or preferably an oxygen/compressed air mixture at 24. The ratio of the mixture is adjusted to the quality of the raw materials and to the fine-ore proportion. In most cases, the proportion of compressed air in the mixture will be approximately 10%.

According to a technically simpler, although economically less advantageous version it is possible to employ the same oxygen/compressed air ratio both in the smelting and in the gas zone of the blast-furnace 10.

The injection of hot air advantageously results in additional sensible heat and nitrogen being introduced into the gas space of the modified blast-furnace.

The hot reduction gas escapes via the gas outlet 25. The run-off is designated by 26.

The reduction unit 12 consists of a lower section 28, known as the reduction shaft, and a section 30 which is located above this, has a distinctly wider internal diameter and is known as the disengaging space. Debouching into the reduction unit 12, in the transition zone between the disengaging space 30 and the reduction shaft 28, there is a water-cooled proportioning screw 32 via which a coarse fraction of the ore to be reduced and of the additions, where appropriate, can be introduced into the reduction unit.

Coarse ore, fine ore and, where required, coarse additions are fed to the reduction unit 12 via a common feeder vessel 34, a valve 36 for the material, which also serves as a seal, and a common intermediary vessel 38, and via a storage bin 40 upstream of the proportioning screw 32 or via a storage bin 44 upstream of a water-cooled fine-ore proportioning screw 42. The speed and delivery of the proportioning screw 32 is controlled by the level measurement 46 of the topmost bed. The feed of the fine-ore fraction by means of the proportioning screw 42 is determined by the ratio to the coarse ore.

Via a common feed bin 48 and an intermediary container 52 connected thereto via valves 50 for the material, which also serve as seals, and via separate lines 54 and 56, respectively, downstream of said intermediary container, the plant is supplied with fine additions, coal and/or coke.

Line 54 leads to a stock vessel 58 for fine additions, from which the material is dispensed via a proportioning screw 60 to a calcining unit 62, to which the hot reduction gas flowing out via the gas outlet 25 is supplied via a line 64.

The reduction gas generated in the blast-furnace 10 has a temperature of over 1000° C. and, before being used in the reduction unit, has to be cooled down to approximately 850° C. In doing so, given a smelting capacity of 50 t/h of pig iron and an amount of reduction gas of approximately 88,000 $m^3$(s.t.p.)/h, a gas heat of approximately 23 GJ/h for heating and calcining approximately 9 t/h of the fine addition fraction and/or of the fine coke is used in the calcining unit 62, to which end there is arranged in the calcining unit 62 a suitable appliance 66 which introduces the reduction gas into the fine additions and, if required, also into the bed of fine coke. If coke is used in the process, the calcining unit may also be supplied via line 54 with fine coke which is then, like the fine additions, preferably introduced via a water-cooled discharge screw 68 into the bottom zone of the reduction shaft 28 above the bottommost bed. The appropriately cooled reduction gas is introduced via a line 70, which emerges at the top end of the calcining unit, into the bottom zone of the reduction unit 12. The amount of addition is controlled by the gas inlet temperature at the reduction unit.

Owing to the heat transfer to the fine additions and to the endothermal calcining reaction, the hot reduction gas is cooled down in the calcining unit.

It is advantageous to replace the fine additions by fine coke, because this can be used in a larger amount, almost double the amount, of approximately 18 t/h, and thus a more extensive reduction in the concentration of the fine sponge-iron particles into the range of 1050 kg of solids to 600 kg of fine sponge-iron particles, which reduces the risk of agglomerate formation while maintaining unchanged the reduction potential of the reduction gas. If fine additions are used, on the other hand, the $CO_2$ content of the reduction gas will rise slightly, owing to the conversion of dolomite and limestone into calcium oxide and magnesium oxide and $CO_2$.

Arranged in the reduction shaft 28 above one another there are a plurality of gas distributor trays 72 which in each case alternately slope downwards inwards from the outside and cause the material introduced into the reduction shaft 28 to be guided in a cascade-like manner. Each gas distributor tray 72 consists of a number of tray elements 74, which are arranged at a vertical spacing with respect to one another and so as to overlap one another in a vertical direction, which are inclined—or, as shown by way of illustration in FIG. 3—arranged with a horizontal surface, and whose staggering defines the overall slope, indicated by lines 76, of the gas distributor tray 72. The spacing of the tray elements 74 sets the gap width of the gas passage holes 78 in the gas distributor tray 72 in such a way that the gas can flow out into the bed situated above the gas distributor tray 72, but the material does not traverse these orifices but in each case drops downwards at the bottom end of each gas distributor tray 72.

The reduction gas traverses the individual beds from the bottom upwards in cross-flow to the material flow and in doing so performs the reduction work, while at the same time it gives off to the bed the major part of the dust it carries. In this process, the reduction of the ore to sponge iron having a degree of metallization of over 90% takes place by means of the reduction gas which contains carbon monoxide and hydrogen, and calcining of the additions takes place by way of intensive contact between gas and particles in the fluidized beds or beds above the gas distributor tray 72. In this arrangement, the course of the process at the top gas distributor trays, which are charged with the coarse fraction, is comparable to the fixed bed process, while after the addition of the fine fraction the process corresponds to the spouting bed process.

In contrast to conventional reduction processes, it is desirable for dust to be given off to the beds, because it leads to a reduction in the concentration of the fine sponge iron particles and thus to a reduction in the risk of agglomerate formation.

The tray elements 74 are provided with a water-cooling system which, for example, is depicted in FIG. 3, the vertical central axis of the unit being designated as A. Each tray element consists of a plate 80, which is joined to a double-walled tube 82, whose central cavity 84, connected at one end to the cooling-water supply, and whose annulus 86, connected to the cooling-water discharge at the same end, communicate at the other end. The plate 80 and the tube 82 are sheathed by a thermal insulation 87 made of mineral wool or the like, which in turn is encompassed by a jacket 88 made of heat-resistant steel. This prevents excessive cooling of the reduction gas via the cooling of the gas distributor tray 72.

At the bottom end of each gas distributor tray 72, a tray element 74a having an approximately vertically arranged plate 80 is arranged in such a way that it forms a downward-projecting wall which above the bed located under the gas distributor tray 72 in question keeps clear a gas space in which the reduction gas can collect before flowing upwards through the gas distributor tray 72.

Above each of the gas distributor trays 72 a conveying and loosening appliance is provided which, in assisting the effect of gravity and the momentum transfer and loosening caused by the rising gas, moves the material on in a uniform manner and at the same time loosens it and thus counteracts agglomeration.

These conveying and loosening appliances consist, in the example shown, of water-cooled conveyor screws 90 which are arranged above the gas distributor trays, are placed so as to cover virtually the entire area, and are mounted in an overhung manner on the wall of the reduction shaft 28. For example, up to five conveyor screws 90 per gas distributor tray 72 may be provided. In addition to preventing agglomerate formation, the conveying and loosening appliances promote movement of the material over the entire tray area and thus an increased specific capacity of the unit, since motionless spaces not swept by reduction gas are avoided.

A high specific capacity is also produced by the coarse ore fraction, which for complete reduction requires the longest residence time in the reduction unit, covering the longest distance in the reduction unit 12.

Because the bed in the transition zone of two successive trays predominantly contains the fine particles and is located above the start of the screw, and because the screws have the characteristic of drawing in, at the start of the screw, the material located above downwards into the conveying range of the screw, the screws also serve for improved mixing of the coarse with the fine or dust-like material, because the latter, under the influence of the reduction gas stream directed from the bottom upwards, tends to collect as the topmost layer of each bed. As the topmost bed consists of coarse material only, it is possible, if appropriate, to dispense with a conveying and loosening appliance above the topmost gas distributor tray.

In order to prevent agglomerate formation in the zone upstream of the discharge screw 16, which zone is at a particularly high risk in this respect owing to the collection of fine sponge iron and the relatively high temperature of the incoming reduction gas, there is provided below the bottom-most gas distributor tray 72 at least one further water-cooled loosening screw 92.

Since intensive contact between the reduction gas and the bed is ensured, as well as the added amount of coarse ore and the required residence time for the reduction being regulated as a function of the particle size, high metallization of the sponge iron is achieved at the same time as high flexibility of the plant and insensitivity with respect to changes in raw material parameters and process parameters.

The addition of the fine ore in the middle zone of the reduction unit 12 has the effect of the reduction unit requiring larger amounts of heat so that a gas temperature of over 750° C. for reducing the coarse ore located in the zone above the fine-ore supply is still ensured.

In order to maintain the temperature of the reduction gas in the reduction unit 12 at the optimum value, if possible, and in order to be able to compensate for heat losses, the line 64 is connected via a branch line 64a to the middle zone of the reduction unit 12, where the gas supplied via line 70 has already given off heat. In addition it is possible to introduce reduction gas, via a further branch line 64b run via a cooler 94, at the bottom end of the reduction unit 12 into the discharge zone for the purpose of pressure equalization, in order to ensure reliable discharge by means of the discharge screw 16. Injection of hot air into the blast-furnace 10 likewise has a beneficial effect on the gas temperature in the reduction unit 12, because the reduction gas generated in the blast-furnace 10 additionally contains nitrogen which increases the amount of gas and performs an important function as a heat transfer medium.

For a high fine-ore proportion of 50%, the proportion of hot air will be approximately one third of the total amount of oxidant, and may increase further, for a high fine-ore proportion of 70% and a substantially increased gangue content, up to 45%, since, as the fine-ore proportion increases, the specific calorific requirement of the reduction unit 12 and thus also the amount of reduction gas has to be increased, as a result of which the top gas temperature at the top end of the reduction unit 12 will increase from approximately 300° C. to 500° C.

Owing to the disengaging space 30, a part of the fine and dust-like material conveyed upwards by the reduction gas can settle on the topmost bed. The remainder is discharged at the top end of the reduction unit 12, together with the spent reduction gas, via a line 96 and is fed to a cyclone 98, in which a further part of the dust is precipitated, which is recycled, via a dust discharge screw 100, to the topmost bed in the reduction unit, whence it is fed, with the aid of conveying appliances, to the next lower gas distributor tray. The gas outlet of the cyclone 98 is connected via a line 102 to a gas scrubber 104, whence the cleaned gas can be passed on, via a line 106, as exported gas to further use for metallurgical or other processes. Based on the above-mentioned assumption of a smelting capacity of 50 t/h of pig iron, an amount of exported gas of 88,000 m$^3$(s.t.p.)/h is obtained, having a lower calorific value of approximately 6600 kj/m$^3$(s.t.p.).

For the purpose of supplying the blast-furnace 10 with the carbon carrier, the line 56 runs from the intermediary vessel 52 to a storage bin 108, and via a proportioning screw 110 to the blast-furnace 10.

To the extent described above, the plant according to FIG. 1 also corresponds essentially to the plant according to FIG. 2, in both embodiments the hot air introduced at 22 into the blast-furnace being supplied via a line 112, which incorporates a heat exchanger 114, in which the cleaned and scrubbed gas output from the reduction unit 12 is burnt and gives off heat to the hot blast. There is, however, a difference insofar as, in the embodiment according to FIG. 2, the cleaned gas fed to the heat exchanger 114 for burning is drawn from line 106 via a branch line 116, while in the embodiment according to FIG. 1 it is drawn from an additional gas treatment plant, designated overall by 120, which has the advantage that the blast-furnace 10, in order to avoid start-up problems when the reduction unit 12 is switched off for repair, can continue to be operated at a minimal smelting capacity.

This additional gas treatment plant 120 has two feed lines which can be used optionally, namely a line 122 run out from the reduction unit 12, from a gas space in the middle zone thereof, and a line 124, which bypasses the calcining unit 62 and branches off from line 64, the line 122 connecting the reaction [sic] unit 12, and line 124 connecting the blast-furnace 10, directly to two successive cyclones 126 and 128, and a downstream gas cleaning system 130, from which a line 132 the cleaned gas can be delivered [sic] to further use, or via a branch line 106a to the heat exchanger 114.

The dust separated in the cyclones 126 and 128 is discharged, if gas is supplied to plant 120, via the line 124, preferably via gas-cooling and outward-transfer vessels 134 and 138. If the gas comes via line 122, the separated dust is conveyed back, via a conveyor screw 125 and a line 127, into the gas space from which line 122 is run, in order to avoid problems due to gas pressure differentials.

The diversion of part of the reduction gas from the middle zone of the reduction unit 12 via line 122 serves to reduce the content of alkalis in the furnace circulation. If, in the case of low alkali content of the raw materials, venting of reduction gas via line 122 from the reduction unit 12 is not required, the heat exchanger 114 can be heated, as in the example according to FIG. 2, from the top gas discharged from the reduction unit via line 96, as in this case so-called "bleeding" of the system is not required.

The reduction capacity of the reduction unit 12, and the smelting capacity of the modified blast-furnace 10, are regulated by the rotational speed of the discharge screw 16.

The coarse-ore/fine-ore ratio can be varied in a very wide range, although the addition of coarse ore in an amount of approximately 20% of the total amount of ore is virtually indispensable, in order to keep the dust discharge within acceptable limits by means of binding the dust to the surfaces of the coarse particles, in order to counteract agglomerate formation and to improve the material flow through the reduction unit 12. If the intention is to use fine ore only, the maximum particle size should be at least 5 mm, but preferably 10 mm, and screening should preferably be employed to separate the fine ore into a coarser and a finer fraction, in order to be able to introduce the two fractions separately at different levels into the reduction unit 12.

We claim:

1. Process for producing pig iron from iron ores, in which the iron ores travel from the top downwards through a reduction unit through which a hot reduction gas containing carbon monoxide and hydrogen flows from the bottom of the reduction unit upwards via a succession of oblique trays which are staggered in a cascade-like manner, and the reduction product is drawn off at the bottom end of the reduction unit and is fed to a unit serving for further treatment thereof, and the reduction gas being generated in a gas generator by partial oxidation of carbon carriers or by cracking of natural gas or petroleum, characterized in that, the method of processing iron ores having at least a high proportion of dust-like and/or fine-granular iron ores comprises sorting the iron ore into fractions according to grain size and introducing the iron ore into the reduction unit, in which the iron ore is passed downwards via a system of gas distributor trays, which is located in the reduction unit, in such a way that the coarse fraction of the iron ore is introduced into the top section of the system and the fine fraction of the iron ore is introduced into the middle zone or into the middle and bottom zone of the system.

2. Process according to claim 1, in which additions are added, characterized by sorting the additions into fractions according to grain size and introducing the coarse fraction of the additions into the top section and introducing the fine fraction of the additions into the bottom section of the system.

3. Process according to claim 1, characterized by conveying and loosening, at least above the gas distributor trays following a topmost gas distributor tray, in the metal ores and optionally the additions using the mechanical action of a conveying and loosening device.

4. Process according to claim 1, characterized in that the course fraction of the metal ores and the additions optionally to be added has a particle size of 5–30 mm. tray, the metal ores and optionally the additions using the mechanical action of a conveying and loosening device.

5. Process according to claim 4, characterized in that the particle size of the coarse fraction is limited to 5–15 mm.

6. Process according to claim 3, characterized in that the particle size of the fine fractions is at most 12 mm.

7. Process according to claim 6, characterized in that the particle size of the fine fractions is at most 5 mm.

8. Process according to claim 1, characterized by generating the reduction gases in a smelting unit suitable for smelting the reduction product.

9. Process according to claim 1, characterized by cooling the reduction gases, prior to introducing the reduction gases into the reduction unit, to 800–900° C.

10. Process according to claim 8, characterized by passing the hot reduction gases between the smelting unit and the reduction unit, in order to be cooled, via a calcining unit.

11. Process according to claim 1, characterized by feeding the calcining unit with the fine addition fraction, and introducing the addition fraction, after heating and calcining below one of the gas distributor trays near the bottom of the reduction unit, into a gas space forming below each gas distributor tray in the reduction unit.

12. Process according to claim 11, characterized by admixing the fine addition fraction, that is passed via the calcining unit, with coke.

13. Process according to claim 9, characterized by controlling the temperature of the reduction gases in the calcining unit by heat transfer to the amount of additions which is fed into the calcining unit as a function of the measured gas temperature, and to the optionally admixed coke.

14. Process according to claim 1, characterized by maintaining the temperature in a connection line between the smelting unit and the calcining unit, and in a part of the calcining unit, at a temperature which is sufficient for cracking tar which is contained in the carbon carrier particles entrained in the gas from the smelting unit.

15. Process according to claim 1, characterized by regulating the throughput capacity of the reduction unit by controlling the material infeed as a function of the measured level of fractions at the topmost bed and by controlling the discharge rate at the bottom end of the reduction unit, and maintaining the ratio of the individual fractions at a given ratio adapted to the quantity of reduction gas and other process parameters.

16. Process according to claim 1, characterized by introducing a reduction product discharged from the reduction unit into a modified blast-furnace and smelting the reduction product, in which blast-furnace the level of material is maintained, by means of a level control, at a level that is lowered by 45–75% relative to the hot-blast plane.

17. Process according to claim 1, characterized by feeding the smelting unit with carbon carrier in the form of coal or a mixture of coal and coke.

18. Process according to claim 16, characterized by using oxygen or an oxygen/compressed air mixture as part of the oxidant.

19. Process according to claim 18, characterized by adding part of the oxidant as hot blast in the upper gas space of the modified blast-furnace and injecting the greater part of the oxidant as an oxygen/compressed air mixture via nozzles into the smelting zone of the blast-furnace.

20. Process according to claim 15, characterized by increasing a nitrogen content in the reduction gas by increasing in the oxidants the proportion of compressed air and hot blast, respectively, as a gangue proportion of the ores increases and as the amount of additions and fine ore increases.

21. Process according to claim 17, characterized in that the modified blast-furnace is operated at a positive pressure of from 1 to 5 bar.

22. Process according to claim 21, characterized in that the modified blast-furnace is operated at a positive pressure of approximately 3 bar.

23. Process according to claim 21, characterized by introducing part of the reduction gas from the modified blast-furnace, for the purpose of pressure equalization, after cooling to the temperature required in the reduction unit, into the discharge zone of the reduction unit.

24. Process according to claim 1, characterized by introducing uncooled reduction gas from the gas generator, in order to compensate for heat losses, into the middle zone of the reduction unit.

25. Process according to claim 1, characterized by extracting part of a remaining dust fraction from the spent reduction gas above the topmost bed in the reduction unit in a disengaging space, and then feeding the reduction gas to a cyclone and extracting the major part of the residual dust therein and recycling the dust produced in the cyclone to the reduction unit.

26. Process according to claim 10, characterized by extracting alkaline fractions by, from one of the gas spaces in the top zone of the reduction unit, shunting off part of the reduction gas, dedusting the part of the reduction gas, scrubbing part of the reduction gas in a gas scrubber and then using the part of the reduction gas for preheating the compressed air fed to the modified blast-furnace.

27. Process according to claim 3, characterized by using the calcining unit and a proportioning screw to add the fine fraction of the additions, and optionally, adding a carbon carrier.

28. Apparatus for the thermal and/or chemical treatment of a readily disintegrating material or for producing pig iron, with a first unit for generating a hot gas, wherein the hot gas is a reduction gas, and a second unit for holding the material to be treated thermally and/or chemically, having at least one material inlet arranged in a top section of the second unit and at least one discharge appliance arranged at the bottom end of the second unit for drawing off the material treated thermally and/or chemically, and having at least one inlet for the hot gas arranged in a bottom zone of the second unit, characterized in that, in particular for processing an at least partially fine material, or for reducing at least partially dust-like or fine metal ores, there are arranged in the second unit a plurality of oblique gas distributor trays, which are staggered in a cascade-like manner, alternately slope in opposite directions and are provided with gas passage holes, there being arranged above each tray at least one drivable conveying appliance which conveys downwards along the slope of the bottom and loosens the material, and in that the material inlet is arranged above a topmost bed in the second unit and is provided with a proportioning appliance.

29. Apparatus according to claim 28, characterized in that the conveying appliance consists of 1 to five conveyor screws.

30. Apparatus according to claim 28, characterized in that in the effective range of the conveying appliance, and running in the conveying direction thereof, at least one strip-shaped zone of each gas distributor tray is kept free of gas passage holes.

31. Apparatus according to claim 29, characterized in that at least below one conveyor screw a zone is arranged which is kept free of gas passage holes.

32. Apparatus according to claim 28, characterized in that the conveying device is water-cooled.

33. Apparatus according to claim 28, characterized in that each tray consists of a plurality of tray elements which are arranged above one another and, to form the gas passage holes, are arranged at a distance from one another and, to cover the gas passage holes, are arranged so as to overlap one another in a vertical direction.

34. Apparatus according to claim 33, characterized in that the tray elements are water-cooled.

35. Apparatus according to claim 28, characterized in that the internal diameter of the second unit above the topmost bed is enlarged to form a disengaging space.

36. Apparatus according to claim 28, characterized in that the second unit at the top end is provided with a gas discharge port downstream of which there is a cyclone for dust separation, and in that the dust trap of the cyclone is connected to the second unit via a return line.

37. Apparatus according to claim 36, characterized in that the return line is provided with a conveyor screw.

38. Apparatus according to claim 37, characterized in that the conveyor screw is water-cooled.

39. Apparatus according to claim 28 for producing pig iron, characterized in that the first unit is suitable for generating reduction gas from a carbon carrier, in that the second unit above the bed of the topmost bottom is provided with an inlet for the coarse fraction of the metal ores and optionally of the additions, and in that it has, above the bed of one of the middle trays, an inlet for the fine fraction of the metal ores and optionally of the additions.

40. Apparatus according to claim 39, characterized in that a line, which connects the first unit to a zone of the second unit which is located below the bottom-most tray, for the reduction gas is run via a calcining unit, in that the calcining unit has a top inlet, which is assigned to a proportioning appliance and connected to a stock vessel for the fine fraction of the additions and/or the coke, and a discharge appliance for transferring the calcined and/or preheated material, and in that the discharge appliance above the bed of one of the two bottom-most trays is connected to the second unit.

41. Apparatus according to claim 40, characterized in that the calcining unit between the inlet and the discharge appliance has at least one device for the purpose of gas distribution, which is connected to the reduction gas line emanating from the first unit, and in that the reduction gas line leading to the second unit leaves the calcining unit in the top zone thereof.

42. Apparatus according to claim 40, characterized in that the first unit is a modified blast-furnace which, at the top end, is connected to the discharge appliance arranged at the bottom end of the second unit, and in the top section has a further inlet, which is assigned to a proportioning appliance and connected to a stock bin which is arranged in a system under excess pressure and is designed for a carbon carrier, and in that the blast-furnace in the top zone is provided with injection orifices for hot air, and in the bottom zone is provided with nozzles for injecting an oxygen/compressed air mixture or oxygen.

43. Apparatus according to claim 35, characterized in that the disengaging space has a height of approximately from 3 to 5 m.

44. Apparatus according to claim 28, characterized in that below each gas distributor tray there is provided a gas collection chamber having a mean height of from 1 to 3 m.

45. Apparatus according to claim 28, characterized in that the trays have a slope of from 5° to 30°.

46. Apparatus according to claim 33, characterized in that the gap-forming spacing of the individual tray elements within a tray is from 30 to 200 mm.

47. Apparatus according to claim 28, characterized in that there are arranged in the second unit at least two gas distributor trays.

48. Apparatus according to claim 28, characterized in that there is arranged, in the zone between the bottom-most gas distributor tray and the discharge appliance, at least one appliance for loosening the reduction production to be discharged.

49. Apparatus according to claim 48, characterized in that the loosening appliance is a drivable, water-cooled loosening screw.

50. Apparatus according to claim 28, characterized in that the conveyor screws and the loosening screw are mounted in an overhung manner on the wall of the second unit.

51. Apparatus according to claim 34, characterized in that the cooled parts of the tray elements, of the conveying appliance and the loosening screw are surrounded at least in part by a casing of heat-resistant material.

52. Apparatus according to claim 51, characterized in that the casing consists of heat-resistant steel.

53. Apparatus according to claim 40, characterized in that there is connected, to a gas space in the middle zone of the second unit, a branch line, which is designed for ducting off a smaller part of the reduction gas from the second unit and which via at least one cyclone leads to a gas purification system, and in that the dust of the at least one cyclone can be recycled to the gas space via a dust discharge appliance.

54. Apparatus according to claim 53, characterized in that there emanates, from the reduction gas line between the first unit and the calcining unit, a bypass which is optionally actuable and can be separated from the reduction unit, bypasses the calcining unit and opens into a branch line.

* * * * *